United States Patent
Subramanian et al.

(10) Patent No.: US 10,638,395 B2
(45) Date of Patent: Apr. 28, 2020

(54) COMMUNICATION TERMINAL AND METHOD FOR PERFORMING A CELL SELECTION OR RESELECTION

(71) Applicant: Intel IP Corporation, Santa Clara, CA (US)

(72) Inventors: Kumaran Subramanian, Oberasbach (DE); Sudeep Manithara Vamanan, Nuremberg (DE); Shadi Iskander, Unterhaching (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/776,807

(22) PCT Filed: Dec. 18, 2015

(86) PCT No.: PCT/US2015/066544
§ 371 (c)(1),
(2) Date: May 17, 2018

(87) PCT Pub. No.: WO2017/105474
PCT Pub. Date: Jun. 22, 2017

(65) Prior Publication Data
US 2018/0332521 A1 Nov. 15, 2018

(51) Int. Cl.
*H04W 4/00* (2018.01)
*H04W 36/30* (2009.01)
(Continued)

(52) U.S. Cl.
CPC ......... *H04W 36/305* (2018.08); *H04W 24/02* (2013.01); *H04W 24/10* (2013.01);
(Continued)

(58) Field of Classification Search
CPC .................................................. H04W 36/305
See application file for complete search history.

(56) References Cited

U.S. PATENT DOCUMENTS

| 9,974,106 B2 * | 5/2018 | Shiizaki | ............... | H04W 4/021 |
| 2005/0079870 A1 * | 4/2005 | Rick | .................... | H04W 60/04 |
| | | | | 455/437 |

(Continued)

FOREIGN PATENT DOCUMENTS

| WO | 2010151089 A2 | 12/2010 |
| WO | 2011133079 A1 | 10/2011 |

OTHER PUBLICATIONS

3GPP TS 36.214; "3rd Generation Partnership Project; Technical Specification Group Radio Access Network;Evolved Universal Terrestrial Radio Access (E-UTRA); Physical layer; Measurements (Release 12)"; Mar. 2015; V12.2.0.

(Continued)

*Primary Examiner* — Gerald A Smarth (57) ABSTRACT

According to various examples, a communication terminal is described comprising a transceiver configured to perform a first attempt for selection of or reselection to a target radio cell, a measurement circuit, configured to measure, if the first attempt fails, a reception quality of the target cell, a memory configured to store an indication of the measured reception quality and a controller configured to determine a time for a second attempt for selection of or reselection to the target radio cell based on the stored indication and to control the transceiver to perform the second attempt at the determined time.

18 Claims, 6 Drawing Sheets

(51) Int. Cl.
*H04W 48/16* (2009.01)
*H04W 24/02* (2009.01)
*H04W 24/10* (2009.01)
*H04W 36/00* (2009.01)
*H04W 36/08* (2009.01)
*H04W 36/20* (2009.01)

(52) U.S. Cl.
CPC ....... *H04W 36/0088* (2013.01); *H04W 36/08* (2013.01); *H04W 36/20* (2013.01); *H04W 48/16* (2013.01)

(56) References Cited

U.S. PATENT DOCUMENTS

| | | |
|---|---|---|
| 2010/0190499 A1 | 7/2010 | Wu |
| 2010/0203892 A1* | 8/2010 | Nagaraja ............... H04W 36/30 455/437 |
| 2010/0240367 A1* | 9/2010 | Lee ................... H04W 36/0077 455/435.2 |
| 2011/0053566 A1* | 3/2011 | Nader ................. H04W 72/005 455/414.1 |
| 2013/0176866 A1 | 7/2013 | Yang et al. |
| 2014/0056217 A1 | 2/2014 | Yang et al. |

OTHER PUBLICATIONS

3GPP TS 36304; "3rd Generation Partnership Project; Technical Specification Group Radio Access Network; Evolved Universal Terrestrial Radio Access (E-UTRA); User Equipment (UE) procedures in idle mode (Release 12)", Jun. 2015; V12.5.0.

3GPP TS 36331; "3rd Generation Partnership Project; Technical Specification Group Radio Access Network; Evolved Universal Terrestrial Radio Access (E-UTRA); Radio Resource Control (RRC); Protocol specification (Release 12)"; Jun. 2015; V12.6.0.

International Search Report based on application No. PCT/US2015/066544 dated Aug. 24, 2016 (12 pages) (reference purpose only).

* cited by examiner

COMMUNICATION TERMINAL AND METHOD FOR PERFORMING A CELL SELECTION OR RESELECTION

CROSS-REFERENCE TO RELATED APPLICATION

The present application is a national stage entry according to 35 U.S.C. § 371 of PCT application No.: PCT/US2015/066544 filed on Dec. 18, 2015, and is incorporated herein by reference in its entirety and for all purposes.

TECHNICAL FIELD

Embodiments described herein generally relate to communication terminals and methods for performing a cell selection or reselection.

BACKGROUND

In a cellular mobile communication system, a typical functionality is that a mobile terminal performs a selection to a target radio cell or a reselection from a current radio cell to a target radio cell. However, a selection of or a reselection to a certain cell may fail due the mobile terminal being unable to receive the radio cell's system information and the mobile terminal may, as a consequence, bar the cell for a certain time to avoid repeated failed selection or reselection attempts which would waste power. On the other hand, in certain scenarios, a barring of a radio cell may not be desirable since the mobile terminal may for example need to reselect to the radio cell before the duration of the barring has expired to avoid loss of connectivity, e.g. to avoid missing of paging messages. Accordingly, efficient approaches for setting the timing of a selection or reselection attempt after a failed selection or reselection attempt are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
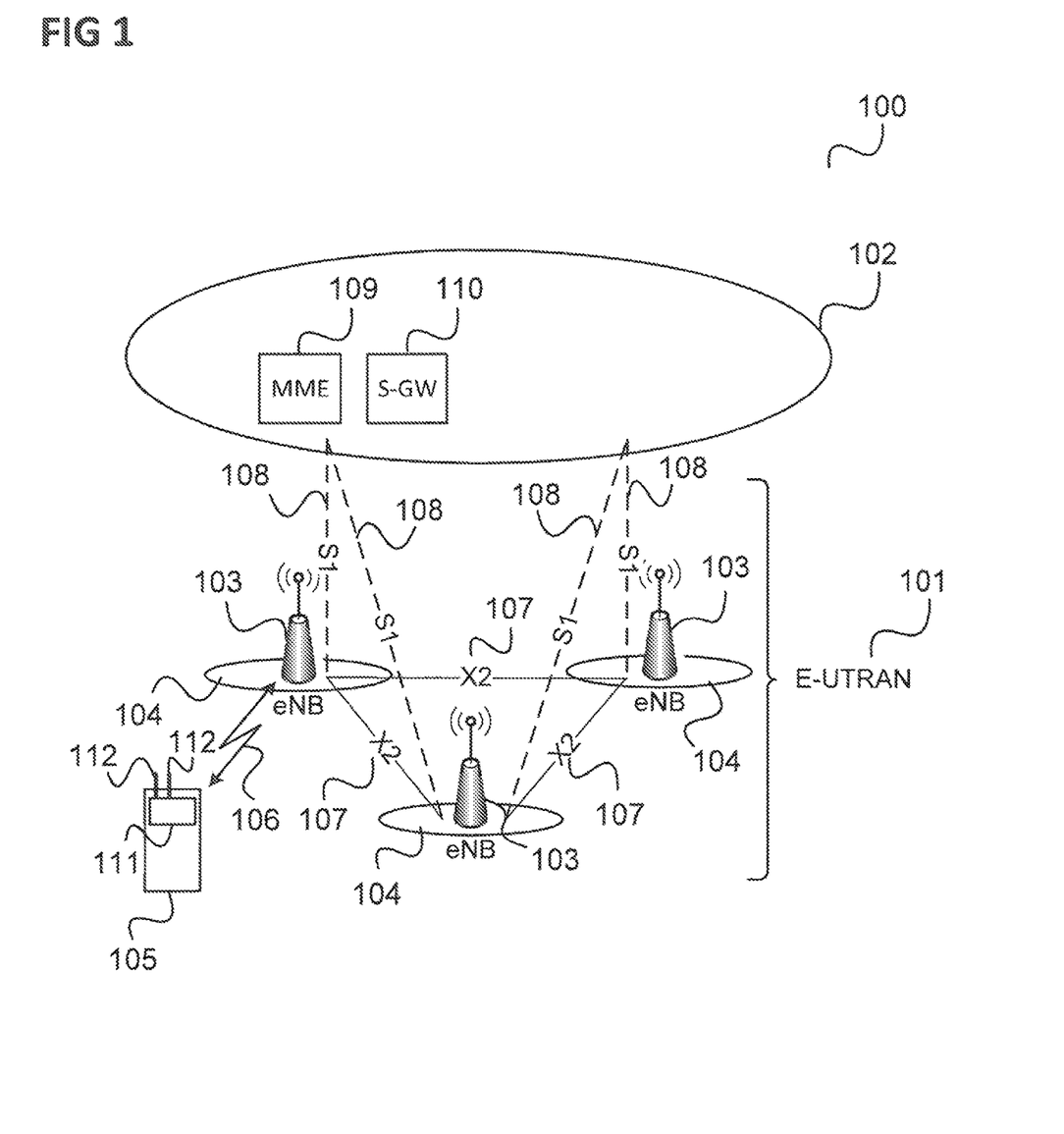
FIG. 1 shows a communication system, e.g. an LTE (Long Term Evolution) communication system

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

For radio communication via the air interface 106, the mobile terminal 105 includes a radio transceiver 111 and, in this example, multiple antennas 112.

Data transmission between the mobile terminal 105 and the corresponding base station 103 (i.e. the base station operating the radio cell in which the mobile terminal 105 is located) is carried out in accordance with a (radio) frame structure.

The mobile terminal 105 may be within the coverage area of more than one mobile communication network which may operate according to the same RAT (radio access technology) or according to different RATs.

When the mobile terminal 105 is switched on, it needs an initial radio cell 104 to camp on (for example to be able to receive paging information, e.g. to be reachable by other users), i.e. the mobile terminal 105 has to perform a so-called cell selection. Similarly, when the mobile terminal 105 leaves the coverage area of one radio cell 104 it needs to find another radio cell 104 to camp on, i.e. the mobile terminal 105 has to perform a so-called cell reselection. This is illustrated in FIG. 2.

Figure 2:
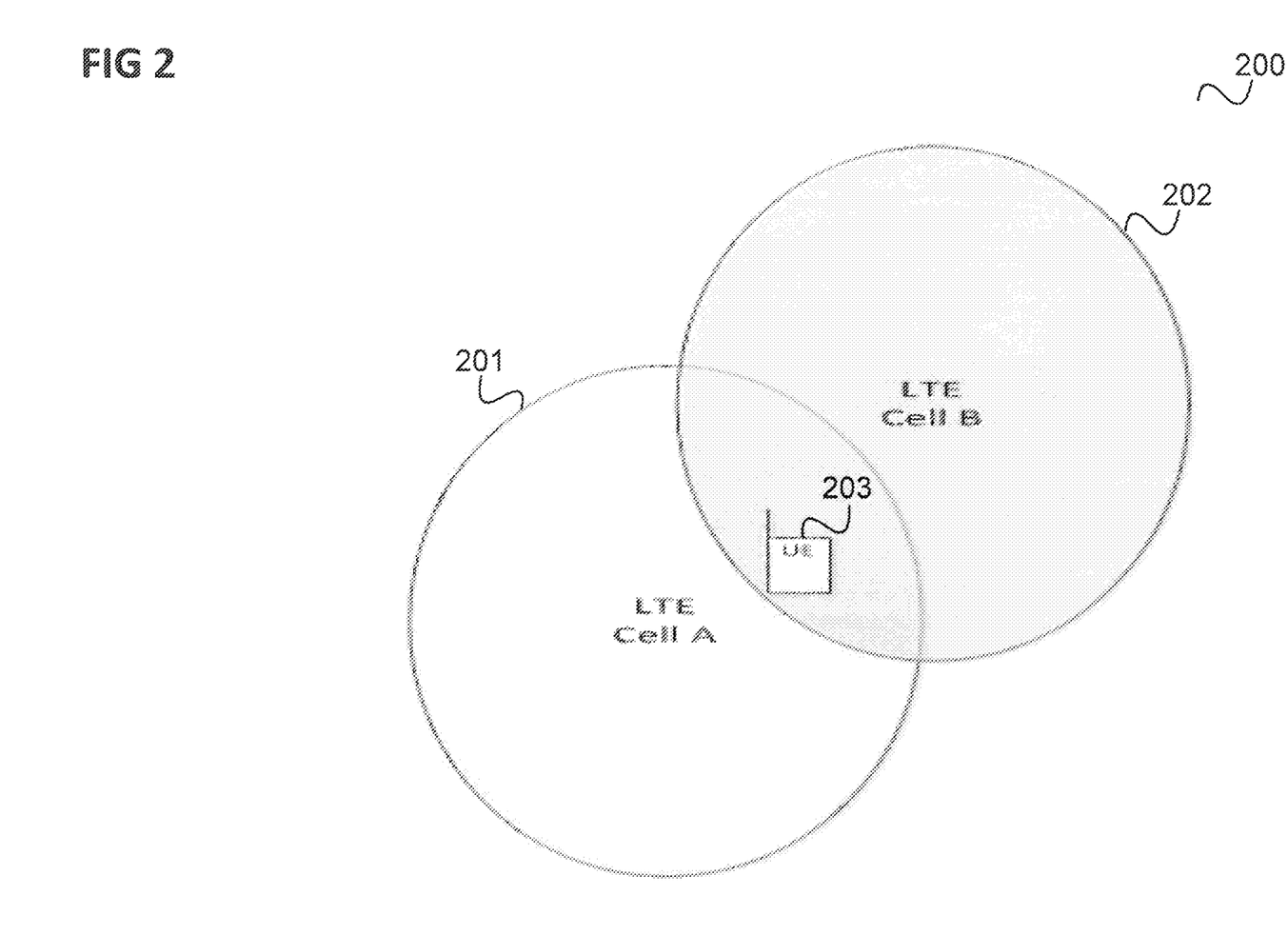
FIG. 2 shows a communication arrangement including two radio cells.

FIG. 2 shows a communication arrangement 200 including a first radio cell 201, e.g. corresponding to one of the radio cells 104, and a second radio cell 202, e.g. corresponding to another one of the radio cells 104. A mobile terminal 203, e.g. corresponding to mobile terminal 105, is located in the coverage of both radio cells 201, 202 and is assumed to be leaving the coverage area of the first ratio cell 201, causing the mobile terminal 203 to attempt to camp on the second radio cell 202 by means of a camping procedure.

The camping procedure includes the reception of system information blocks (SIBs) from the second radio cell 202. Failure to acquire essential SIBs during the camping procedure is a reason to blacklist an LTE cell. If the mobile terminal (i.e. the UE in the case of LTE) does not blacklist such a cell, it may face repeated reselection failures for this cell. However, the typical action of barring for a period of 300 seconds may not be beneficial for the case that the SI (system information) acquisition failure was due to a temporary reception condition (like a transient interference condition).

Namely, barring a reselection candidate cell for a longer duration (such as 300 sec as specified according to Third Generation Partnership Project 3GPP) increases the likelihood of staying in a weaker cell (i.e. the first radio cell 201 in the example of FIG. 2) which increases the probability of missing paging (UE may become temporarily not reachable) and increases the probability of usage of a suboptimal cell while in the coverage of the better cell (which is barred due to SI acquisition failure) causing interference.

On the other hand, barring a reselection candidate cell for a shorter duration (less than the specified 300 secs) increases the probability of failed reselection attempts resulting in increased power consumption for failed reselection attempts (which involve SI acquisition) and may result in increased paging interruption time during the failure reselection attempts (the UE may become temporarily not reachable when it has left the coverage area of the current serving cell, i.e. the first radio cell 201 in the example of FIG. 1).

For example, the issue may be faced that when 3G to LTE reselection is triggered (i.e. in the scenario that the first radio cell 201 is a 3G cell and the second radio cell 202 is an LTE cell), but the reselection fails due to SIB reading failure, the reselection attempt and the failure may keep happening periodically until the LTE radio cell becomes better (i.e. reception quality at the UE 203 improves) and the SIB reading (i.e. the SI acquisition) is then successful.

Further, it should be noted that according to 3GPP, a cell does not necessarily have to be barred for a constant 300 second timer but rather for any value up to 300 seconds.

In the following an approach for selection or reselection, respectively, of a mobile terminal to a radio cell, e.g. an LTE cell, which has been previously barred due to SI acquisition failure is described which includes dynamically increasing or decreasing the cell selection or reselection evaluation rate to the cell which has been previously blacklisted (i.e. barred) due to the SI acquisition failure and deciding whether to try reselection or selection, respectively, on a cell which has been previously blacklisted due to SI acquisition failure or not, even if it satisfies reselection criteria.

This allows reducing unnecessary power drain by failed reselection attempts and at the same time also increases the possibility to reselect to a better cell earlier, thus avoiding that the mobile terminal is temporary out of service (i.e. avoiding that the mobile terminal is unreachable).

According to various examples, the mobile terminal uses, along with RSRP (Reference Signal Received Power) & RSRQ (Reference Signal Received Quality), RSSNR (Reference Signal-Signal to Noise Ratio) measurements (i.e. Signal to Noise Ratio measurements which are not influenced by the load on the target cell) obtained at the time of the SI acquisition failure and at the time of the most recent RSSNR (Reference Signal Received Power) measurement for the cell and decides to:

Increase the selection evaluation rate or reselection evaluation rate, respectively. For the reselection case, the mobile terminal additionally uses the serving cell's RSSNR value to increase the measurement rate as well as the reselection evaluation rate if the target cell is available on a higher priority frequency (i.e. if the target cell, e.g. the second radio cell 202 in the example of FIG. 2, operates on a frequency which was given a high priority as target for reselection, e.g. by the network).

Only try selection or reselection to the cell if the RSSNR improved from the last value (measured at the time of the reselection failure).

In other words, according to various embodiments, the mobile terminal takes action to make sure that a radio cell is not unnecessarily penalized for a longer duration than required by increasing the selection evaluation rate or reselection evaluation rate, respectively, for example when reception quality of the target cell for the selection or reselection (e.g. in terms of its RSSNR) has improved since the selection or reselection failure.

It should be noted that if, on the other hand, a mobile terminal bars a radio cell for only a short time and if the interference condition has not changed, the mobile terminal may face repeated reselection failures to the same cell leading to power drain due to unnecessary reselection attempts and possibly to an increased paging interruption time, thus increasing the probability of missing a paging.

Accordingly, in the approach described in the following, a mechanism is provided which avoids both too long barring of a radio cell as well as too short barring of a radio cell and can thus be seen to be based on an optimization on how to treat cells with SI Acquisition failures.

In the following, the two scenarios
(a) SI Acquisition failure in a target cell during reselection
(b) SI Acquisition failure in a target cell during cell selection
are considered separately.

With respect to scenario (a) SI Acquisition failure in a target cell during reselection, an arrangement as illustrated in FIG. 2 can be considered in which the mobile terminal 203 leaves the coverage area of the first radio cell 201 (which is the current serving cell in this case and is also referred to as cell A) and attempts a cell reselection to the second radio cell 202 (which is the target cell for the reselection in this case and is also referred to as cell B).

Figure 3:
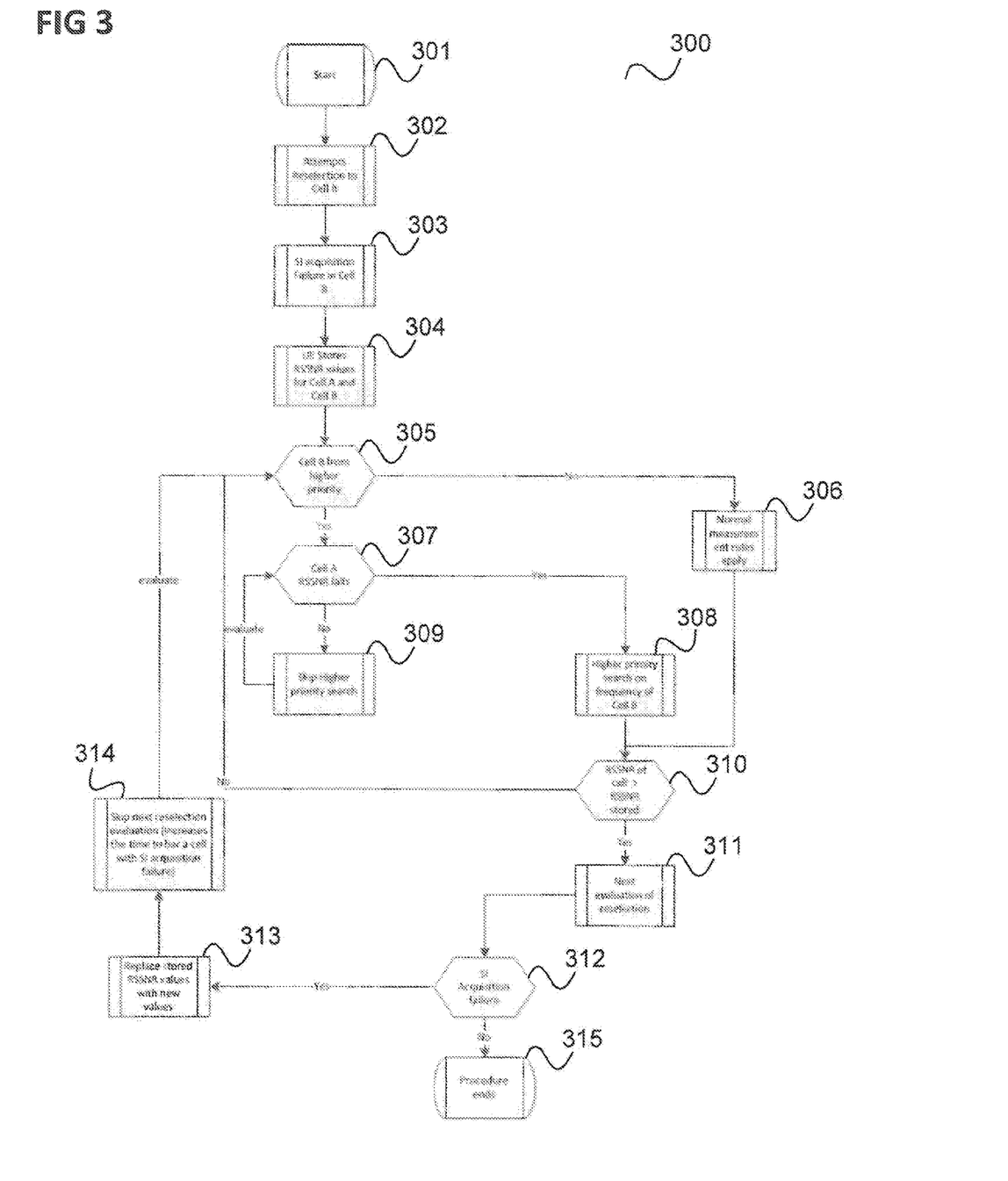
FIG. 3 shows a flow diagram illustrating a procedure for cell reselection.

FIG. 3 shows a flow diagram 300 illustrating a procedure for cell reselection which the mobile terminal 203 may for example perform.

The procedure starts in 301.

In 302, the mobile terminal 203 attempts to reselect to the second radio cell 203 (cell B).

It is assumed that in 303, during the attempted cell reselection to the second radio cell 203 (in general to a neighbor cell of the serving cell), the mobile terminal 203 faces an SI Acquisition failure (i.e. a failure to read mandatory SIBs within a predefined time period).

Therefore, in 304, the mobile terminal 203
a. Measures and stores the RSSNR, the RSRP and the RSRQ values of the target cell and
b. Measures and stores the RSSNR, the RSRP and the RSRQ values of the serving cell.

The mobile terminal 203 continues to perform measurements on the target cell.

Specifically, in 305, the mobile terminal 203 determines whether the target cell has a higher priority. If this is not the case, the mobile terminal 203 applies, in 306, the normal measurement rules (e.g. according to the 3GPP LTE standard). For example, for intra-frequency or equal-priority inter-frequency or lower priority inter-frequency cells, the mobile terminal 203 performs no modification of the normal measurement cycle (as specified by the communication standard used by the communication network to which the radio cells belong).

If the target cell is a higher priority cell (e.g. operates on a frequency which has high priority for reselection, as e.g. defined by the network) the mobile terminal 203 applies the normal higher priority search periodicity (e.g. as defined by 3GPP) but an additional high priority search can be triggered in 308 immediately if the mobile terminal detects, in 307, that
  i. the serving cell's RSSNR value drops from the stored value by a certain threshold or
  ii. If the serving cell's RSSNR value shows a trend (e.g. three consecutive measurements show falling RSSNR values)

If the mobile terminal 203 does not detect these two conditions, the mobile terminal 203 skips, in 309, the additional higher priority search.

In 310, if, at the next measurement for the target cell (according to the normal measurement cycle, the higher priority measurement cycle or an additional measurement in 308), if the target cell is still a candidate for reselection (e.g. based on the 3GPP conditions), the mobile terminal 203 triggers another reselection attempt to the target cell in 311 only if the additional condition is fulfilled that the RSSNR measured for the target cell (with the current measurement) is above the RSSNR stored for the target cell in 304.

If this additional condition is not fulfilled, the mobile terminal 203 continues the measurements, e.g. by returning to 305.

If, in 312, the reselection was successful, the procedure ends in 315.

If, however, the reselection has failed because of another Si Acquisition failure, the mobile terminal 203, in 313, updates the stored values of the RSSNR, the RSRP and the RSRQ for the target cell with the current values, but only if those (new) values are above the (old) stored values.

Further, in 314, the mobile terminal 203 increases the timing to the next evaluation (i.e., skips one or more following evaluation cycles for the target cell even if it meets reselection conditions and the additional condition of 310).

For example, mobile terminal increases the evaluation cycle based on the following:
  i) if the difference between the RSSNR measured for the target cell and the RSSNR stored for the target cell is high (for example greater than 1 dB), this means that the RSSNR is improving quickly, and the mobile terminal 203 applies a minimum increase for the timing to the next evaluation (for example uses a constant value of 10 sec).
  ii) Else, if the RSSNR is increasing slowly, the mobile terminal applies a bigger increase for the timing to the next evaluation is applied (for example, it doubles the time until the next evaluation). This is for a case where the RSSNR is very bad, and even after a small increase of the RSSNR the SI acquisition can be expected to still fail. If in this case the mobile terminal would rely only on the RSSNR improvement (without taking into account the size of the improvement), still multiple failing reselection attempts may happen until the RSSNR reaches a level where SI acquisition succeeds.

With respect to scenario (b) SI Acquisition failure in a target cell during selection a mobile terminal 203 for example performs a selection attempt to the second radio cell 202 without being currently camping on the first radio cell 201 (e.g. for initial selection of radio cell after switching on the mobile terminal 203).

Figure 4:
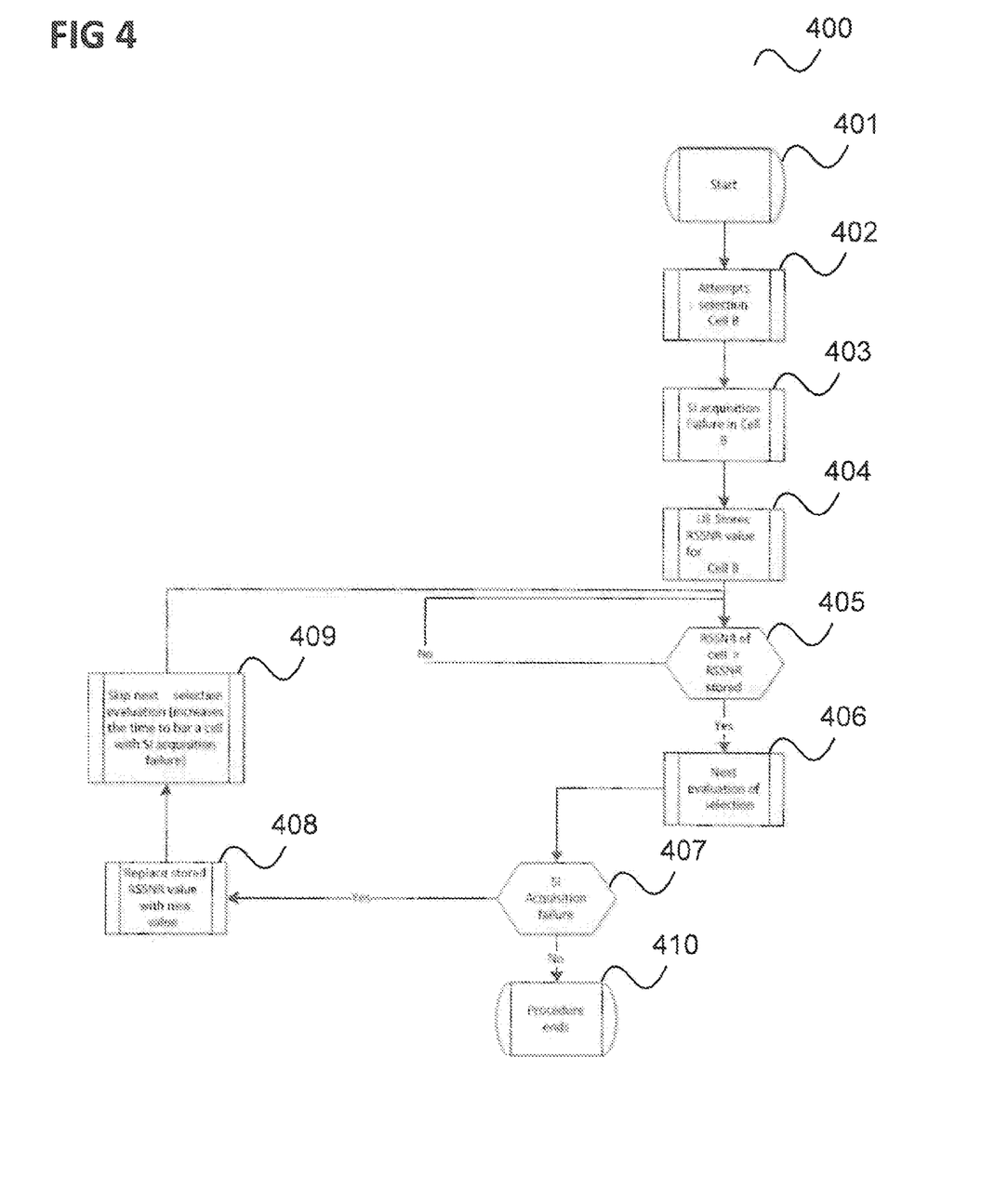
FIG. 4 shows a flow diagram illustrating a procedure for cell selection.

FIG. 4 shows a flow diagram 400 illustrating a procedure for cell selection which the mobile terminal 203 may for example perform.

The procedure starts in 401.

In 401, the mobile terminal 203 attempts to select the second radio cell 202 (cell B), i.e. to camp on the second radio cell 203.

It is assumed that in 403, during the attempted cell selection of the second radio cell 202, the mobile terminal 203 faces an SI Acquisition failure (i.e. a failure to read mandatory SIBs within a predefined time period).

Therefore, in 404, the mobile terminal 203 measures and stores the RSSNR, the RSRP and the RSRQ values of the target cell.

The mobile terminal 203 continues to perform measurements on the target cell.

In 405, if, at the next measurement for the target cell, if the target cell is still a candidate for selection (e.g. based on the 3GPP conditions), the mobile terminal 203 triggers another selection attempt to the target cell in 406 only if the additional condition that the RSSNR measured for the target cell (with the current measurement) is above the RSSNR stored for the target cell in 404 is fulfilled.

If this is condition is not fulfilled, the mobile terminal 203 continues the measurements.

If, in 407, the selection was successful, the procedure ends in 410.

If, however, the selection has failed because of another Si Acquisition failure, the mobile terminal 203, in 408, updates the stored values of the RSSNR, the RSRP and the RSRQ for the target cell with the current values, but only if those (new) values are above the (old) stored values.

Further, in 409, the mobile terminal 203 increases the timing to the next evaluation (i.e., skips one or more following evaluation cycles for the target cell even if it meets selection conditions and the additional condition of 405).

Figure 5:
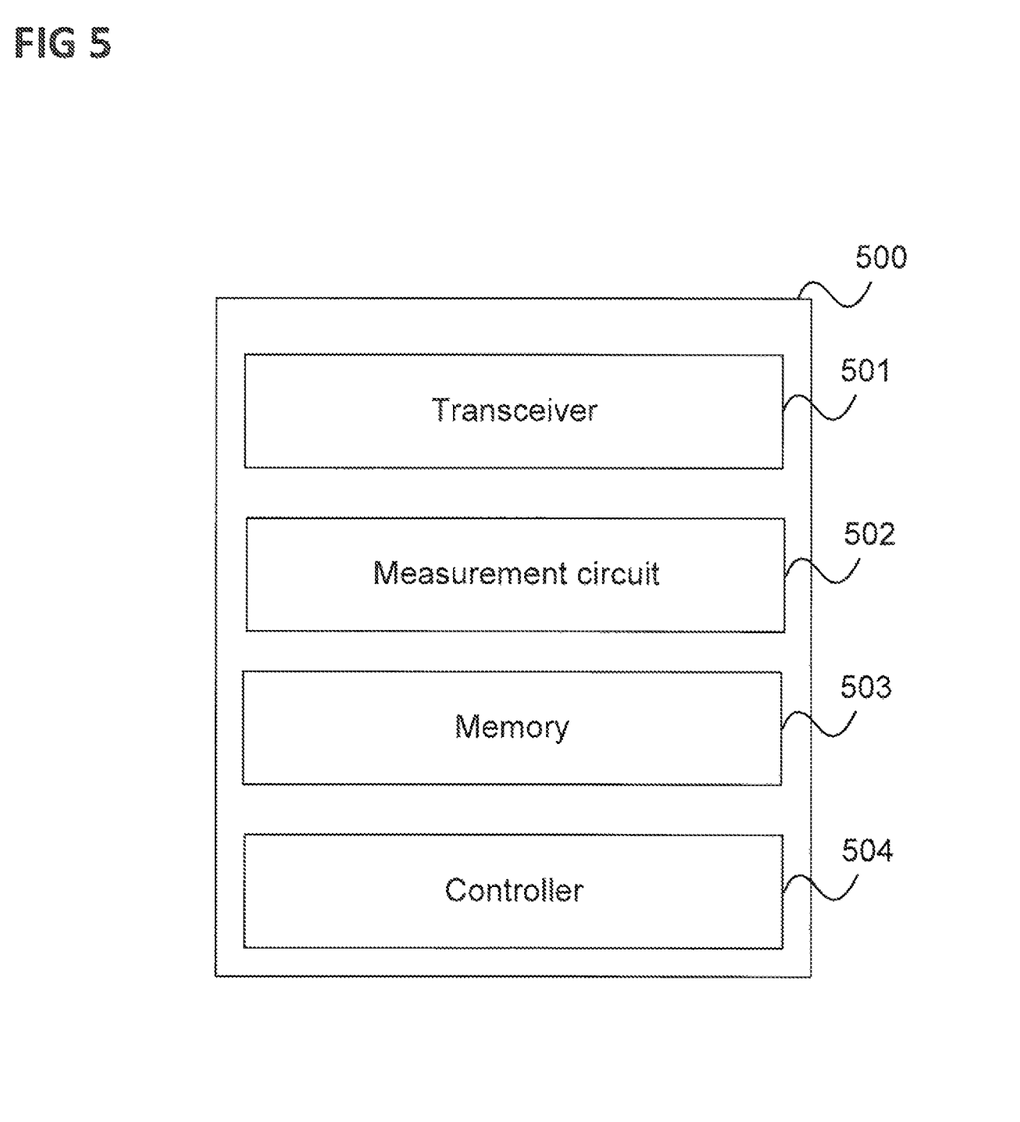
FIG. 5 shows a communication terminal.

In summary, according to various examples, a communication terminal as illustrated in FIG. 5 is provided.

FIG. 5 shows a communication terminal 500.

The communication terminal 500 includes a transceiver 501 configured to perform a first attempt for selection of or reselection to a target radio cell and a measurement circuit 502, configured to measure, if the first attempt fails, a reception quality of the target cell.

The communication terminal 500 further includes a memory 503 configured to store an indication of the measured reception quality and a controller 504 configured to determine a time for a second attempt for selection of or reselection to the target radio cell based on the stored indication and to control the transceiver to perform the second attempt at the determined time.

According to various examples, in other words, a communication terminal adapts the time between two attempts to perform a selection procedure or a reselection procedure based on a reception quality of the target cell at a time (e.g. shortly after) a failure of the first attempt. For example, the communication terminal may advance a time of the second attempt if the reception quality of the target cell is improving (i.e. increasing) faster and may delay a time of the second attempt if the reception quality of the target cell is improving more slowly (or even not at all).

The components of the communication terminal (e.g. the transceiver, the measurement circuit, the memory and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 6:
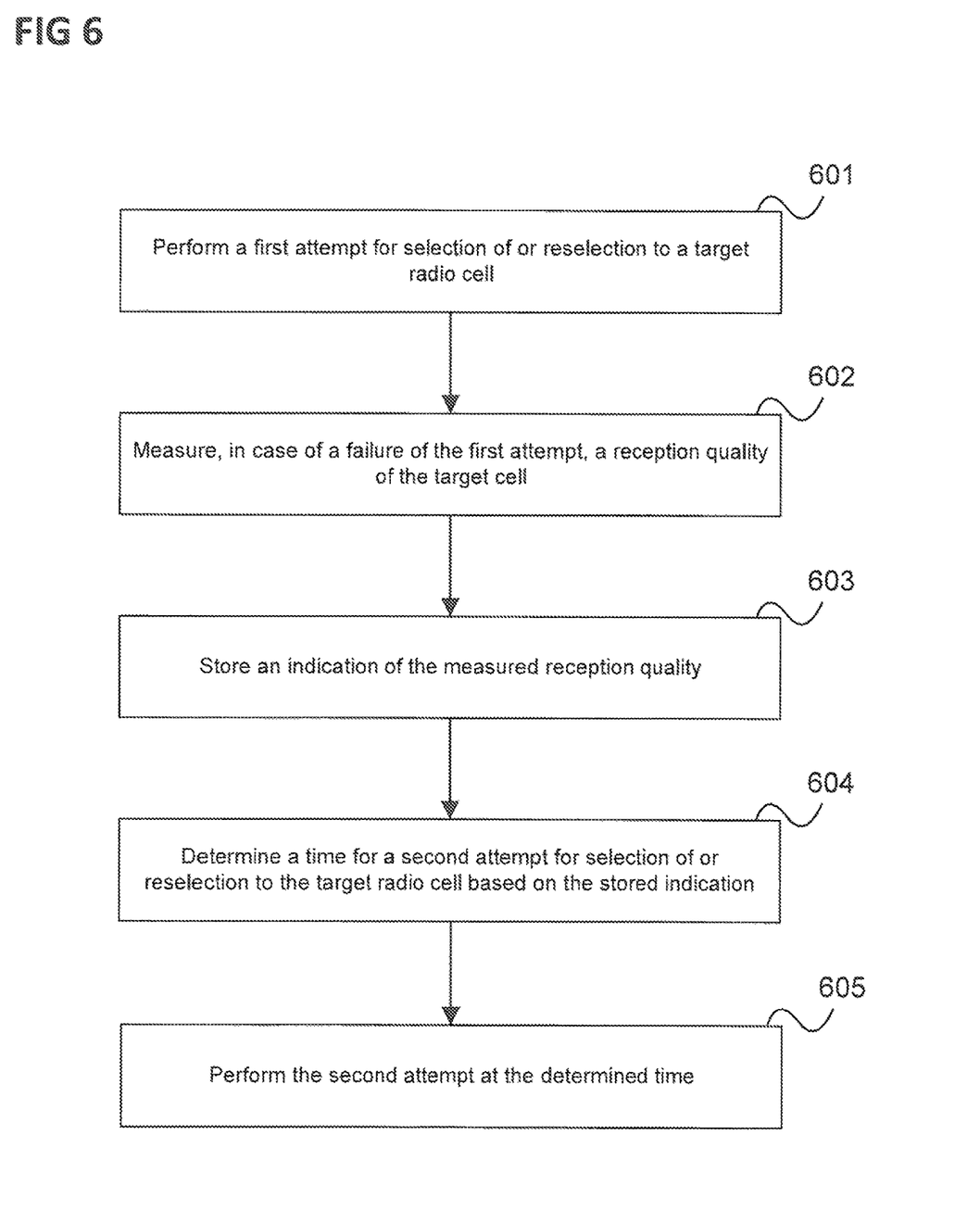
FIG. 6 shows a flow diagram illustrating a method for performing a cell selection or reselection.

The communication terminal for example carries out a method as illustrated in FIG. 6.

FIG. 6 shows a flow diagram 600 illustrating a method for performing a cell selection or reselection, for example carried out by a communication terminal.

In 601, the communication terminal performs a first attempt for selection of or reselection to a target radio cell.

In 602, the communication terminal measures, if the first attempt fails, a reception quality of the target cell.

In 603, the communication terminal stores an indication of the measured reception quality.

In 604, the communication terminal determines a time for a second attempt for selection of or reselection to the target radio cell based on the stored indication.

In 605, the communication terminal performs the second attempt at the determined time.

The following examples pertain to further embodiments.

Example 1 is a communication terminal as illustrated in FIG. 5.

In Example 2, the subject matter of Example 1 may optionally include the failure being a system information acquisition failure.

In Example 3, the subject matter of any one of Examples 1-2 may optionally include the reception quality representing at least one of a noise level and an interference level of the target cell.

In Example 4, the subject matter of any one of Examples 1-3 may optionally include the transceiver being configured to receive, after the failure of the first attempt, a reference signal of the target cell, wherein the reception quality represents at least one of a noise level and an interference level of the reference signal.

In Example 5, the subject matter of any one of Examples 1-4 may optionally include the reception quality being a signal to noise ratio or a signal to interference and noise ratio of the target cell.

In Example 6, the subject matter of any one of Examples 1-5 may optionally include the first attempt and the second attempt being attempts for reselection from a serving cell to the target cell, the measurement circuit being configured to measure, if the first attempt fails, a reception quality of the serving cell, the memory being configured to store an indication of the measured reception quality of the serving cell and the controller being configured to determine the time for the second attempt based on the stored indication of the measured reception quality of the target cell and based on the stored indication of the measured reception quality of the serving cell.

In Example 7, the subject matter of Example 6 may optionally include the controller being configured to detect whether the target cell operates on a frequency fulfilling a predetermined priority criterion and, if the target cell operates on a frequency fulfilling the predetermined priority criterion, control the measurement circuit to measure, if the first attempt fails, a reception quality of the serving cell, control the memory to store an indication of the measured reception quality of the serving cell and determine the time for the second attempt based on the stored indication of the measured reception quality of the target cell and based on the stored indication of the measured reception quality of the serving cell.

In Example 8, the subject matter of Example 7 may optionally include the predetermined priority criterion being whether the target cell operates on a frequency which the communication terminal is to target for reselection with priority over the frequency of the serving cell.

In Example 9, the subject matter of any one of Examples 6-8 may optionally include the measurement circuit being configured to perform a second measurement of the reception quality of the serving cell when a predetermined time interval after the first selection attempt has elapsed and the controller being configured to advance a time for the second attempt if the reception quality of the serving cell as measured in the second measurement has deteriorated with respect to the reception quality of the serving cell as indicated by the stored indication.

In Example 10, the subject matter of any one of Examples 6-9 may optionally include the measurement circuit being configured to perform a second measurement of the reception quality of the serving cell when a predetermined time interval after the first selection attempt has elapsed and the controller being configured to set a predetermined candidate time as the time for the second attempt if the reception quality of the serving cell as measured in the second measurement has deteriorated with respect to the reception quality of the serving cell as indicated by the stored indication.

In Example 11, the subject matter of any one of Examples 1-10 may optionally include the measurement circuit being configured to perform a second measurement of the reception quality of the target cell when a predetermined time interval after the first selection attempt has elapsed and the controller being configured to delay a time for the second attempt if the reception quality of the target cell as measured in the second measurement has not improved with respect to the reception quality of the target cell as indicated by the stored indication.

In Example 12, the subject matter of any one of Examples 1-11 may optionally include the measurement circuit being configured to perform a second measurement of the reception quality of the target cell when a predetermined time interval after the first selection attempt has elapsed and the controller being configured to set a predetermined candidate time as the time for the second attempt if the reception quality of the target cell as measured in the second measurement has improved with respect to the reception quality of the target cell as indicated by the stored indication.

In Example 13, the subject matter of any one of Examples 1-12 may optionally include the controller being configured to determine the time of the second attempt based on a predetermined time interval between attempts.

In Example 14, the subject matter of Example 13 may optionally include the controller being configured to increase, if the second attempt fails, the time interval between attempts and to determine the time of a third attempt for selection of or reselection to the target cell based on the increased time interval between attempts.

In Example 15, the subject matter of any one of Examples 1-14 may optionally include the controller being configured to set the time for the second attempt the earlier the faster the reception quality of the target cell is improving with respect to the reception quality as indicated by the stored indication.

Example 16 is a method for performing a cell selection or reselection as illustrated in FIG. 6.

In Example 17, the subject matter of Example 16 may optionally include the failure being a system information acquisition failure.

In Example 18, the subject matter of any one of Examples 16-17 may optionally include the reception quality representing at least one of a noise level and an interference level of the target cell.

In Example 19, the subject matter of any one of Examples 16-18 may optionally include receiving, after the failure of the first attempt, a reference signal of the target cell, wherein the reception quality represents at least one of a noise level and an interference level of the reference signal.

In Example 20, the subject matter of any one of Examples 16-19 may optionally include the reception quality being a signal to noise ratio or a signal to interference and noise ratio of the target cell.

In Example 21, the subject matter of any one of Examples 16-20 may optionally include the first attempt and the second attempt being attempts for reselection from a serving cell to the target cell and the method comprising measuring, if the first attempt fails, a reception quality of the serving cell, storing an indication of the measured reception quality of the serving cell and determining the time for the second attempt based on the stored indication of the measured reception quality of the target cell and based on the stored indication of the measured reception quality of the serving cell.

In Example 22, the subject matter of Example 21 may optionally include detecting whether the target cell operates on a frequency fulfilling a predetermined priority criterion and, if the target cell operates on a frequency fulfilling the predetermined priority criterion, measuring, if the first attempt fails, a reception quality of the serving cell, storing an indication of the measured reception quality of the serving cell and determining the time for the second attempt based on the stored indication of the measured reception quality of the target cell and based on the stored indication of the measured reception quality of the serving cell.

In Example 23, the subject matter of Example 22 may optionally include the predetermined priority criterion being whether the target cell operates on a frequency which the communication terminal is to target for reselection with priority over the frequency of the serving cell.

In Example 24, the subject matter of any one of Examples 21-23 may optionally include performing a second measurement of the reception quality of the serving cell when a predetermined time interval after the first selection attempt has elapsed and advancing a time for the second attempt if the reception quality of the serving cell as measured in the second measurement has deteriorated with respect to the reception quality of the serving cell as indicated by the stored indication.

In Example 25, the subject matter of any one of Examples 21-24 may optionally include performing a second measurement of the reception quality of the serving cell when a predetermined time interval after the first selection attempt has elapsed and setting a predetermined candidate time as the time for the second attempt if the reception quality of the serving cell as measured in the second measurement has deteriorated with respect to the reception quality of the serving cell as indicated by the stored indication.

In Example 26, the subject matter of any one of Examples 16-25 may optionally include performing a second measurement of the reception quality of the target cell when a predetermined time interval after the first selection attempt has elapsed and delaying a time for the second attempt if the reception quality of the target cell as measured in the second measurement has not improved with respect to the reception quality of the target cell as indicated by the stored indication.

In Example 27, the subject matter of any one of Examples 16-26 may optionally include performing a second measurement of the reception quality of the target cell when a predetermined time interval after the first selection attempt has elapsed and setting a predetermined candidate time as the time for the second attempt if the reception quality of the target cell as measured in the second measurement has improved with respect to the reception quality of the target cell as indicated by the stored indication.

In Example 28, the subject matter of any one of Examples 16-27 may optionally include determining the time of the second attempt based on a predetermined time interval between attempts.

In Example 29, the subject matter of Example 28 may optionally include increasing, if the second attempt fails, the time interval between attempts and determining the time of a third attempt for selection of or reselection to the target cell based on the increased time interval between attempts.

In Example 30, the subject matter of any one of Examples 16-29 may optionally include setting the time for the second attempt the earlier the faster the reception quality of the target cell is improving with respect to the reception quality as indicated by the stored indication.

Example 31 is a computer readable medium having recorded instructions thereon which, when executed by a processor, make the processor perform a method for performing a cell selection or reselection according to any one of Examples 16 to 30.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication terminal comprising:
   a transceiver configured to perform at least one attempt for selection of or reselection to a target radio cell;
   a measurement circuit, configured to perform, based on at least one attempt failing, a plurality of measurements of a reception quality of the target radio cell and/or a serving radio cell;
   a memory configured to store an indication of a prior reception quality of the target radio cell and/or serving radio cell; and a controller configured to determine a time for a subsequent attempt for selection of or reselection to the target radio cell and to control the transceiver to perform the subsequent attempt at the determined time based on one of:
a rate of change of the prior reception quality of the target radio cell compared to a current measured reception quality of the target radio cell and a rate of change of a prior reception quality of the serving radio cell compared to a current measured quality of the serving radio cell.

2. The communication terminal of claim 1,
wherein failure of the at least one attempt is a system information acquisition failure.

3. The communication terminal of claim 1,
wherein the reception quality represents at least one of a noise level and an interference level of the target radio cell.

4. The communication terminal of claim 1,
wherein the transceiver is configured to receive, after a first attempt fails, a reference signal of the target radio cell, wherein the reception quality represents at least one of a noise level and an interference level of the reference signal.

5. The communication terminal of claim 1,
wherein the reception quality is a signal to noise ratio or a signal to interference and noise ratio of the target radio cell.

6. The communication terminal of claim 1,
wherein, when a first attempt and a second attempt are attempts for reselection from a serving radio cell to the target radio cell, the measurement circuit is further configured to measure, based on the first attempt failing, a reception quality of the serving radio cell, the memory is further configured to store an indication of the measured reception quality of the serving radio cell, and the controller is further configured to determine the time for the subsequent attempt based on a stored indication of the measured reception quality of the target radio cell and based on the stored indication of the measured reception quality of the serving radio cell.

7. The communication terminal of claim 6,
wherein the controller is further configured to detect whether the target radio cell operates on a frequency fulfilling a predetermined priority criterion and, based on the target radio cell operating on a frequency fulfilling the predetermined priority criterion, control the measurement circuit to measure, based on the first attempt failing, a reception quality of the serving radio cell, control the memory to store an indication of the measured reception quality of the serving radio cell, and determine the time for the subsequent attempt based on the stored indication of the measured reception quality of the target radio cell and based on the stored indication of the measured reception quality of the serving radio cell.

8. The communication terminal of claim 7,
wherein the predetermined priority criterion is whether the target radio cell operates on a frequency which the communication terminal is to target for reselection with priority over the frequency of the serving radio cell.

9. The communication terminal of claim 6,
wherein the measurement circuit is configured to perform a second measurement of the reception quality of the serving radio cell when a predetermined time interval after the first attempt has elapsed and wherein the controller is further configured to advance a time for the subsequent attempt based on a reception quality of the serving radio cell as measured in the second measurement deteriorating with respect to the reception quality of the serving radio cell as indicated by the stored indication.

10. The communication terminal of claim 6,
wherein the measurement circuit is further configured to perform a second measurement of the reception quality of the serving radio cell when a predetermined time interval after the first attempt has elapsed and wherein the controller is further configured to set a predetermined candidate time as the time for the subsequent attempt based on the reception quality of the serving radio cell as measured in the second measurement deteriorating with respect to the reception quality of the serving radio cell as indicated by the stored indication.

11. The communication terminal of claim 1,
wherein the measurement circuit is further configured to perform a second measurement of the reception quality of the target radio cell when a predetermined time interval after a first attempt has elapsed and wherein the controller is further configured to delay a time for the subsequent attempt based on the reception quality of the target radio cell as measured in the second measurement not improving with respect to the reception quality of the target radio cell as indicated by the stored indication.

12. The communication terminal of claim 1,
wherein the measurement circuit is further configured to perform a second measurement of the reception quality of the target radio cell when a predetermined time interval after a first selection attempt has elapsed and wherein the controller is further configured to set a predetermined candidate time as the time for a second attempt based on the reception quality of the target radio cell as measured in the second measurement improving with respect to the reception quality of the target radio cell as indicated by the stored indication.

13. The communication terminal of claim 1,
wherein the controller is further configured to determine the time of the subsequent attempt based on a predetermined time interval between attempts.

14. The communication terminal of claim 13,
wherein the controller is further configured to increase, based on the subsequent attempt failing, a time interval between attempts and to determine the time of a third attempt for selection of or reselection to the target radio cell based on the increased time interval between attempts.

15. The communication terminal of claim 1,
wherein the controller is further configured to set the time for the subsequent attempt earlier the faster the reception quality of the target radio cell is improving with respect to the reception quality as indicated by the stored indication.

16. The communication terminal of claim 1,
wherein the subsequent attempt is based on a comparison between the rate of change of the prior reception quality of the target radio cell compared to a current measured quality of the target radio cell and the rate of change of the prior reception quality of the serving radio cell compared to a current measured quality of the serving radio cell.

17. A method for performing a cell selection or reselection comprising
performing at least one attempt for selection of or reselection to a target radio cell;

taking, based on at least one attempt failing, a plurality of measurements of a reception quality of the target radio cell and/or a serving radio cell;

storing an indication of the prior reception quality of the target radio cell and/or serving radio cell;

determining a time for a subsequent attempt for selection of or reselection to the target radio cell based on one of:
  a rate of change of the prior reception quality of the target radio cell compared to a current measured quality of the target radio cell and a rate of change of the prior reception quality of the serving radio cell compared to a current measured quality of the serving radio cell; and performing the subsequent attempt at the determined time.

18. A non-transitory computer readable medium having recorded instructions thereon which, when executed by a processor, make the processor perform a method for performing a cell selection or reselection according to claim 17.

\* \* \* \* \*